(12) United States Patent
Billings

(10) Patent No.: US 8,628,332 B2
(45) Date of Patent: Jan. 14, 2014

(54) COMMUNICATION DEVICES AND METHODS OF USE

(75) Inventor: Dawn L. Billings, Mesa, AZ (US)

(73) Assignee: Dawn L. Billings, Inc., Mesa, AZ (US)

( * ) Notice: Subject to any disclaimer, the term of this patent is extended or adjusted under 35 U.S.C. 154(b) by 454 days.

(21) Appl. No.: 12/889,246

(22) Filed: Sep. 23, 2010

(65) Prior Publication Data

US 2011/0070568 A1    Mar. 24, 2011

Related U.S. Application Data

(60) Provisional application No. 61/244,949, filed on Sep. 23, 2009.

(51) Int. Cl.
*G09B 19/00* (2006.01)

(52) U.S. Cl.
USPC .......................................................... 434/236

(58) Field of Classification Search
USPC .............. 434/236, 237, 238, 433; 446/71, 72, 446/369, 390, 391
See application file for complete search history.

(56) References Cited

U.S. PATENT DOCUMENTS

| | | | | |
|---|---|---|---|---|
| 4,573,927 A * | 3/1986 | Newman | 434/236 |
| 4,645,470 A * | 2/1987 | Benton | 446/73 |
| 4,762,494 A * | 8/1988 | Woods | 434/236 |
| 4,917,607 A * | 4/1990 | Van Hoose | 434/236 |
| 5,044,959 A * | 9/1991 | Shaver et al. | 434/236 |
| 5,127,107 A * | 7/1992 | Wood et al. | 2/84 |
| 5,324,201 A * | 6/1994 | Friedel | 434/236 |
| 5,405,266 A * | 4/1995 | Frank et al. | 434/237 |
| 5,807,155 A * | 9/1998 | Divvleeon | 446/73 |
| 6,422,871 B2 * | 7/2002 | Shepherd | 434/236 |
| 6,434,769 B1 * | 8/2002 | Koenig | 5/636 |
| 6,447,363 B1 * | 9/2002 | Carraway | 446/268 |
| 6,692,330 B1 * | 2/2004 | Kulick | 446/297 |
| 7,051,559 B1 * | 5/2006 | Hollis | 70/63 |
| 7,182,601 B2 * | 2/2007 | Donnan | 434/236 |
| 2004/0087245 A1 * | 5/2004 | Toht et al. | 446/376 |
| 2005/0079791 A1 * | 4/2005 | Treibitz et al. | 446/391 |
| 2008/0287033 A1 * | 11/2008 | Steinberg | 446/297 |
| 2009/0018841 A1 * | 1/2009 | Leeds et al. | 704/272 |
| 2011/0014842 A1 * | 1/2011 | Rappaport-Rowan | 446/72 |
| 2011/0028067 A1 * | 2/2011 | Forks et al. | 446/369 |

* cited by examiner

*Primary Examiner* — Kurt Fernstrom
(74) *Attorney, Agent, or Firm* — Kirton McConkie; Evan R. Witt

(57) ABSTRACT

A device and system to facilitate communication between a first communicator and a second communicator to teach desired behaviors, values, principles, and skills. The device includes a plush or stuffed toy form having one or more pockets which are sized and configured to receive one or more communication symbols. The communication symbols may represent thoughts, feelings, actions, goals, behavior, values, or other concepts to be discussed by the first communicator and second communicator. First communicator/second communicator discussion occurs as the communication symbols are placed into and removed from the pockets.

19 Claims, 14 Drawing Sheets

COMMUNICATION DEVICES AND METHODS OF USE

BACKGROUND OF THE INVENTION

1. Field of the Invention

The present invention relates in general to enhancing communication by means of a communication device. More particularly, the present invention relates to systems and methods for providing a communication device, such as a plush or stuffed toy form, having one or more pockets disposed thereon, and employing the communication device to enhance communication between a first communicator and a second communicator. Enhanced communication facilitates teaching of desired behaviors, values, principles, and skills.

2. Background and Related Art

It has long been the objective of parents and teachers alike to instruct children in correct behaviors, values, principles, and skills with a view toward enhancing the transfer of such qualities and characteristics in terms of both effectiveness and efficiency. Within homes and classrooms, prior teaching and disciplinary technologies have ranged from corporal punishment to outright apathy.

In a typical contemporary family, parents often lack the knowledge, skills, tools, money, and/or time to teach their children critical life skills. For example, there are presently numerous single parent families and numerous households where both parents work outside the home thereby depriving such parents of meaningful time to spend teaching and instructing their children. As a result, television, videos, the Internet, videogames, and advertising impose an ever increasing and dominant influence in the lives of such children.

Currently, many different types of teaching and educational tools exist. However, many such tools have shortcomings. In one example, certain tools are very costly and therefore unattainable for many contemporary families. In another example, certain tools require an inordinate amount of time to implement and are therefore unfeasible. In yet another example, certain tools fail to capture the interest of children and as a result are simply ineffective over longer periods of time. As a result, such tools must frequently be replaced at additional cost and effort.

Thus, while techniques currently exist that are used to enhance communication and facilitate teaching of desired behaviors, values, principles, and skills, it would be an improvement in the art to augment or even replace current techniques with improved or more effective techniques.

BRIEF SUMMARY OF THE INVENTION

The present invention relates in general to enhancing communication by means of a communication device. More particularly, the present invention provides a communication device, such as a plush or stuffed toy form, having one or more pockets disposed thereon, and employing the communication device to enhance communication between a first communicator and a second communicator.

Implementation of the present invention takes place in association with a communication device adapted to facilitate the teaching of desired behaviors, values, principles, and skills. In one aspect, the methods and techniques disclosed herein feature a communication device between a first communicator and a second communicator. In some implementations, the communication device may be a plush or stuffed toy form. The plush toy may be in any form but will typically include a body with a front side and a back side, a head connected to the body, one or more upper extremities connected to the body adjacent the head, and one or more lower extremities connected to the body opposite the upper extremities. In such implementations, the upper extremities may be arms and the lower extremities may be legs. Further, in some implementations, the communication device may include one or more pockets disposed on the plush toy. In such implementations, the pockets are adapted to receive one or more communication symbols. The communication symbols are configured to be placed into and withdrawn from the pockets disposed on the plush toy by either the first communicator and/or the second communicator.

The first communicator may be any person or group of people who desires the second communicator to learn or acquire the desired behavior, value, principle or skill. In some implementations, however, the first communicator is a parent or a teacher. Similarly, the second communicator may be any person or group of people learning or acquiring the desired behavior, value, principle, or skill. Again, however, in some implementations, the second communicator is a child or a student.

Alternatively, in some implementations, the first and second communicators could be an adult couple, such as spouses, employing the communication device to improve their interpersonal communication and strengthen their relationship. Likewise, the communication device could be employed with mature youth, teenagers, and even between other platonic adults. Similarly, the device could be employed in a training setting, such as between corporate managers and employees and the like. In such implementations, the communication device may be selected according to the age and maturity of either the first or the second communicator. Moreover, the communication device may take any form suitable for practicing the invention. As a non-limiting example, a communication device for use between spouses, for example, may be a decorative box having one or more drawers or pockets disposed therein adapted to receive the communication symbols as discussed above.

Implementation of the present invention may occur when a second communicator, such as a child, engages in behavior that is discouraged by a first communicator, such as a parent. Such behavior could include, for example, fighting, lying, stealing, hurting others and so forth. Under circumstances akin to those described, a communication process may be implemented between the first and second communicator in the following way.

First, a communication device, such as a plush toy as described above, having one or more pockets may be obtained. The pockets on the communication device may be sized and configured to receive one or more communication symbols. The communication symbol may be any item including written articles or physical objects and the like which serve as an emblem for the topic being discussed, such as fighting. The process continues as a first communication symbol is placed into a first pocket on the communication device. As the first symbol is placed into the first pocket, the first and second communicators discuss the meaning of the symbol as it relates to the second communicators feelings, thoughts, or actions. For example, where the second communicator has engaged in fighting discouraged by the first communicator, the first communication symbol represents fighting. As the fighting symbol is inserted into the first pocket, the first and second communicator may discuss the second communicator's feelings or thoughts that lead to his or her fighting actions. In addition, the first communicator may explain why fighting is discouraged.

The process continues as a second communication symbol, which may be the same or different than the first, is withdrawn from the first pocket. As with the first communication symbol, the second communication symbol may be any item that will serve as an emblem for a desired topic of discussion. Continuing the above example, the second communication symbol may represent peace or another antonym to fighting. As the peace symbol is withdrawn from the first pocket, the first and second communicator may discuss the second communicator's feelings or thoughts about peace particularly as they relate to the second communicator's previous actions. In addition, the first communicator may explain why peace is desirable.

The foregoing communication process is adapted to facilitate teachings of desired behaviors, values, principles, and skills by opening up a channel of amicable communication or dialogue between two communicators. In addition, the communication device serves to visually and physically interpose a thought process between the second communicator's initial conduct and his or her subsequent thoughts, feelings and/or actions about that conduct.

Further implementation of the present invention may occur when a dispute arises between a second communicator, such as a child, and a third party, such as another child. For example, the second communicator and the third party may be involved in a dispute, fighting, or otherwise engaged in an upsetting event. Under circumstances akin to those described, a communication process may be implemented between the first and second communicator to assist the second communicator in resolving the dispute or upsetting event in the following way.

First, a communication device, such as a plush toy as described above, having first and second upper extremities may be provided. The upper extremities may include pockets which may be sized and configured to receive one or more communication symbols as discussed above. The process continues as the second communicator observes and handles the first upper extremity. The first upper extremity symbolically represents the second communicator's point of view with regard to an upsetting event, such as why the second communicator feels justified in fighting with others for example. As the second communicator observes and handles the first upper extremity, he or she is encouraged to consider his or her feelings, thoughts, or actions. This may include recognizing, defining, and naming the second communicator's feelings, thoughts, or actions. In addition, as the second communicator is observing and handling the first upper extremity, the first and second communicator may discuss the second communicator's feelings or thoughts about his or her actions. Accordingly, the first communicator may assist the second communicator in understanding his or her emotions and coping with them in a constructive manner. Further, this process of employing the first upper extremity of the communication device serves to visually and physically interpose a thought process between the upsetting event and the second communicator's subsequent thoughts, feelings and/or actions.

The process continues as the second communicator observes and handles the second upper extremity. The second upper extremity symbolically represents the third party's point of view with regard to the upsetting event, such as why the third party may have engaged in conduct upsetting to the second communicator for example. As the second communicator observes and handles the second upper extremity, he or she is encouraged to consider the feelings, thoughts, or actions of the third party. In addition, as the second communicator is observing and handling the second upper extremity, the first and second communicator may discuss the third party's feelings, thoughts, or actions. The process is completed as the first and second communicators discuss and compare the feelings, thoughts, or actions of the second communicator resolved above with those of the third party. Accordingly, the first communicator may assist the second communicator in understanding the emotions of others and how to address such emotions.

The foregoing communication process is adapted to facilitate teachings of self-awareness, other-awareness, self-management, and relationship management by opening up a channel of amicable communication or dialogue between two communicators. Through the forgoing process, the second communicator learns to calmly evaluate his or her personal feelings, thoughts, and actions and those of other people without behaving rashly. In some implementations, the second communicator engages in the aforementioned process independently.

Some implementations may include one or more of the following features. For example, the communication device may include one or more pockets disposed on the plush toy's head, the front side of the body, the back side of the body, on one or more of the upper extremities, and/or on one or more of the lower extremities. In such implementations, the pockets are symbolic in nature and configured to facilitate teaching of desired behaviors, values, principles, and skills as discussed above.

In a further implementation, the pocket disposed on the front side of the body may receive one or more selectively removable and interchangeable symbolic hearts. In such implementations, the one or more symbolic hearts may further include a pocket adapted to receive one or more communication symbols as discussed above. The symbolic hearts are a metaphor representing the dreams and hopes contained in the second communicator's heart or hope oriented center. The symbolic hearts further facilitate communication between the first and second communicators largely as discussed above.

In another implementation, the communication device further includes a removable cape disposed around the plush toy's neck adjacent the head. In such implementations, the removable cape may receive badges of honor earned by the second communicator. The first communicator may selectively grant the badges of honor to the second communicator for engaging in good behavior as previously defined between the two communicators. Conversely, the badges of honor may be selectively denied or revoked by the first communicator for bad behavior as previously defined the two communicators. In this way, the removable cape serves as a mechanism to teach and incentivize ongoing good behavior.

Similarly, in some implementations, the communication device further includes an electronic audio playback and/or recording component within the plush toy body, head, or extremities adapted to record and/or play back contemporaneously or previously recorded electronic audio signals. For instance, one non-limiting example of an audio playback and/or recording component may be an MP3-type player or other digital audio recorder.

While the methods and processes of the present invention have proven to be particularly useful in the area of employing a communication device to facilitate teaching of desired behaviors, values, principles, and skills, particularly to children, those skilled in the art can appreciate that the methods and processes can be used in a variety of different applications and in a variety of different industries to yield effective communication devices and methods of use. For example, as discussed above, instead of a parent using the communication device to teach a child, the device could be used by an adult couple to improve interpersonal communication and strengthen their relationship. Likewise, the communication device could be employed with mature youth, teenagers, and even between platonic adults. Similarly, the device could be employed in a training setting such as between corporate managers and employees and the like.

These and other features and advantages of the present invention will be set forth or will become more fully apparent in the description that follows and in the appended claims. The features and advantages may be realized and obtained by means of the instruments and combinations particularly pointed out in the appended claims. Further, the features and advantages of the invention may be learned by the practice of the invention or will be obvious from the description, as set forth hereinafter.

BRIEF DESCRIPTION OF THE SEVERAL VIEWS OF THE DRAWINGS

In order that the manner in which the above recited and other features and advantages of the present invention are obtained, a more particular description of the invention will be rendered by reference to specific embodiments thereof, which are illustrated in the appended drawings. Understanding that these drawings depict only typical embodiments of the present invention and are not, therefore, to be considered as limiting the scope of the invention, the present invention will be described and explained with additional specificity and detail through the use of the accompanying drawings in which.

DETAILED DESCRIPTION OF THE INVENTION

Figure 1:
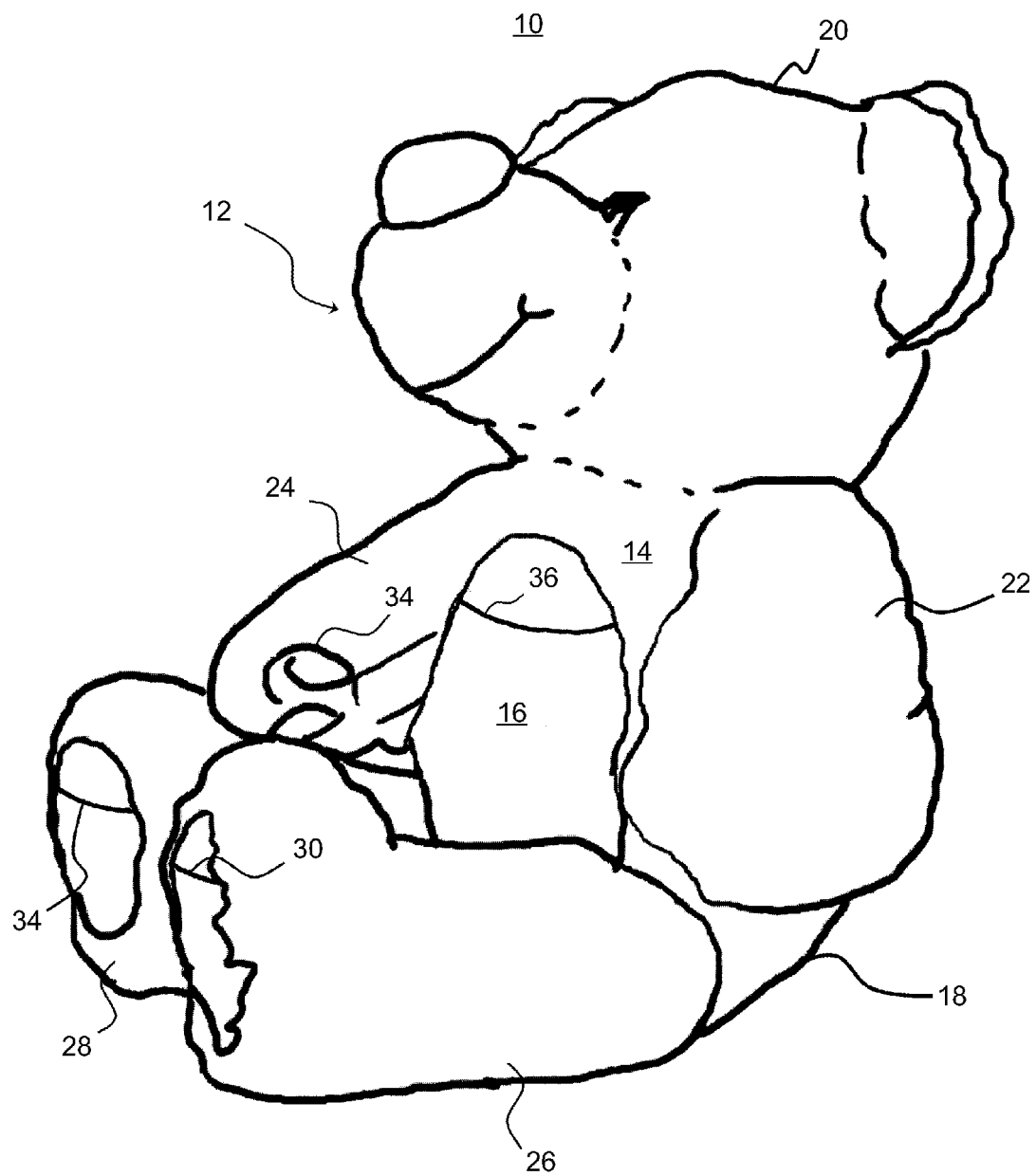
FIG. 1 illustrates a perspective view of a representative embodiment of a communication device of the present invention.
Figure 2:
FIG. 2 illustrates a perspective view of another representative embodiment of a communication device of the present invention, wherein a pocket is disposed on the front side of the body of the communication device in accordance with some embodiments of the present invention.

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

The specific embodiments of the invention will be best understood by reference to the drawings, wherein like parts are designated by like numerals throughout.

Reference throughout this specification to "one embodiment," "an embodiment," or similar language means that a particular feature, structure, or characteristic described in connection with the embodiment is included in at least one embodiment of the present invention. Thus appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of plush toy forms, stuffed toy forms, pockets disposed on the forms, communication symbols, communicators, etc., to provide a thorough understanding of embodiments of the invention. One having ordinary skill in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The present invention relates in general to enhancing communication by means of a communication device. More particularly, the present invention provides a communication device, such as a plush or stuffed toy form, having one or more pockets disposed thereon, and employing the communication device to enhance communication between a first communicator and a second communicator.

Embodiments of the present invention utilize a communication device to facilitate the teaching of desired behaviors, values, principles, and skills. In at least one embodiment, the methods and techniques disclosed herein feature a communication device between a first communicator and a second communicator. In some embodiments, the communication device may be a plush or stuffed toy form. The plush toy may be in any form but will typically include a body with a front side and a back side, a head connected to the body, one or more upper extremities connected to the body adjacent the head, and one or more lower extremities connected to the body opposite the one or more upper extremities. Further, in some embodiments, the communication device may include one or more pockets disposed on the plush toy. In such embodiments, the pockets are adapted to receive one or more communication symbols. The communication symbols are configured to be placed into and withdrawn from the pockets disposed on the plush toy by either the first communicator and/or the second communicator.

First Communicator

The first communicator may be any person or group of people who desires the second communicator to learn or acquire specific behaviors, values, principles, or skills. For example, in some embodiments, the first communicator may be a parent of a child. In such embodiments, the parent may desire that the child learn various life skills such as how to share, cope with disappointment, settle disputes, and so forth. Similarly, the parent may desire that the child learn various behaviors such as helping, listening, reverence, safety, and the like. In other embodiments, the first communicator may be a teacher, counselor, mentor, coach, tutor, trainer, professor, guide, guardian, employer, manager, officer, director, supervisor, foreman, spouse, partner, friend, intimate, confidant, or the like. Regardless of the first communicator's title or relationship to the second communicator, the first communicator can be anyone who seeks to help others learn or acquire specific behaviors, values, principles, or skills and who attempts to communicate with them to facilitate such learning and acquisition.

Second Communicator

The second communicator may be any person or group of people attempting to learn or acquire specific behaviors, values, principles, and skills. In some embodiments, as in the example discussed above, the second communicator may be a child. In such embodiments, the child may be attempting to learn or acquire life skills or behaviors with the assistance of a parent as discussed above. In other embodiments, the second communicator may be a student, trainee, apprentice, pupil, employee, worker, staff member, spouse, partner, friend, intimate, confidant, or the like. For example, the second communicator could be a new employee attempting to learn work related skills such as office protocol or operating equipment and so forth by seeking the guidance of a supervisor. Again, regardless of the second communicator's title or relationship to the first communicator, the second communicator can be anyone who seeks to learn or acquire specific behaviors, values, principles, or skills and who attempts to communicate with others to facilitate such learning and acquisition.

Communication Device

With reference now to FIG. 1, a representative non-limiting embodiment is illustrated. In FIG. 1, a communication device 10 is provided. In some embodiments, communication device 10 is a plush or stuffed toy form 12 as depicted in FIG. 1. The communication device 10, in the form of plush or stuffed toy 12, includes a body 14 having a front side 16 and a back side 18, a head 20 connected to the body 14, one or more upper extremities 22 and/or 24 connected to the body 14 adjacent the head 20, and one or more lower extremities 26 and/or 28 connected to the body 14 opposite the one or more upper extremities 22 and/or 24. In some embodiments, the one or more upper extremities 22 and/or 24 may be plush toy arms. Similarly, in some embodiments, the one or more lower extremities 26 and/or 28 may be plush toy legs.

With continued reference to FIG. 1, in some embodiments the communication device 10, in the form of a plush or stuffed toy 12, may include one or more pockets disposed on the plush toy 12. In FIG. 1, some non-limiting representative pockets are illustrated at 30, 32, 34, and 36. The pockets are adapted to receive one or more communication symbols (not shown). The communication symbols are configured to be placed into and withdrawn from the pockets. The operation and significance of the communication symbols will be discussed in greater detail below.

With reference to FIGS. 1-9, wherein like parts are designated by like numerals throughout, numerous pockets are depicted in various locations and configurations. In some embodiments, the communication device 10 includes one or more pockets 30 and/or 32 disposed at the distal end of one or more of the lower extremities 26 and/or 28. In other embodiments, the communication device 10 includes one or more pockets 34 and/or 40 disposed at the distal end of one or more of the upper extremities 22 and/or 24. In still other embodiments, the communication device 10 includes one or more pockets 36 disposed on the front side 16 of the body 14. In still other embodiments, the communication device 10 includes one or more pockets 42 disposed on the head 20. In still other embodiments, the communication device 10 includes one or more pockets 44 disposed on the backside 18 of the body 14.

Figure 3:
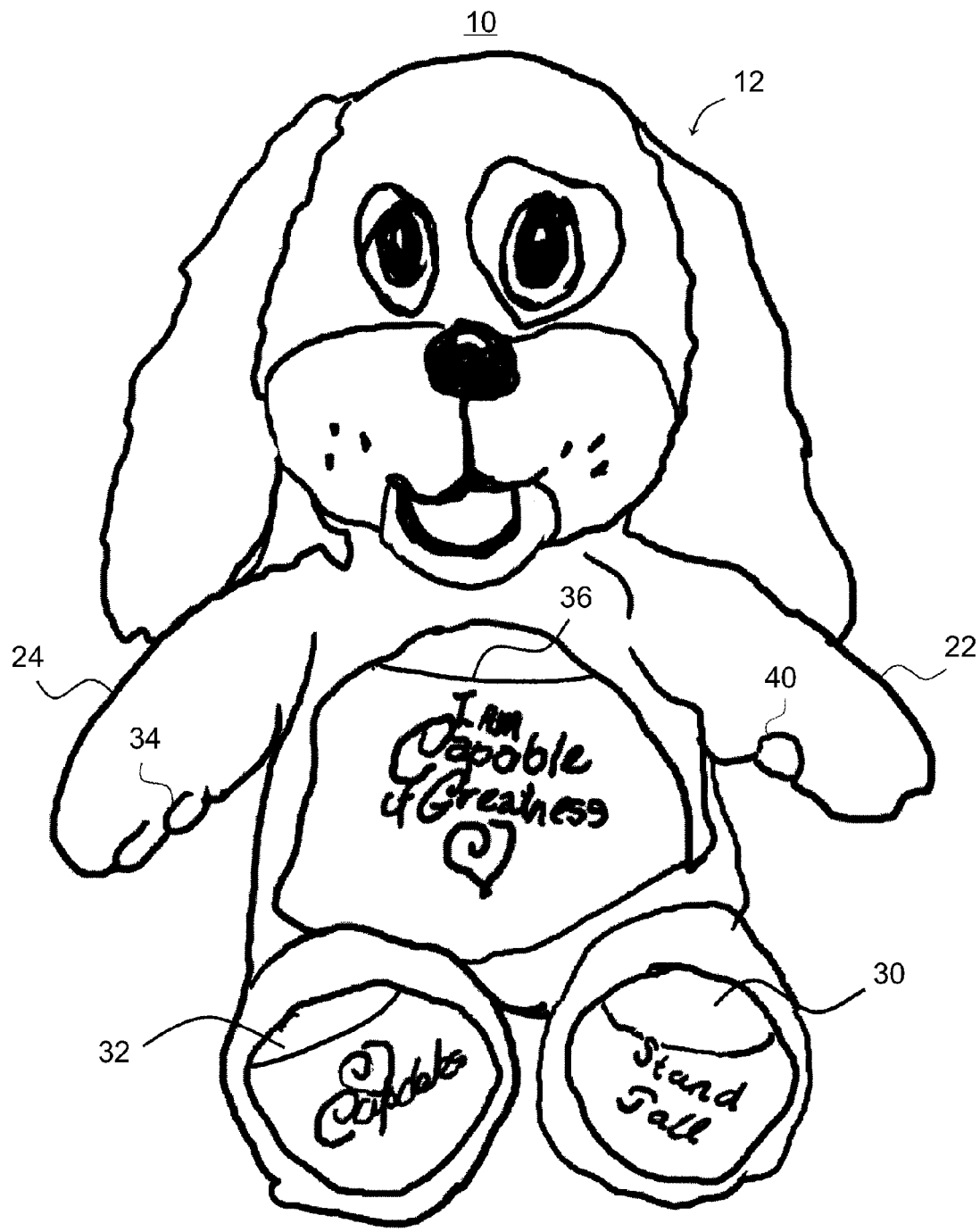
FIG. 3 illustrates a frontal view of another representative embodiment of a communication device of the present invention, wherein a pocket is disposed on one of the lower extremities of the communication device in accordance with some embodiments of the present invention.
Figure 4:
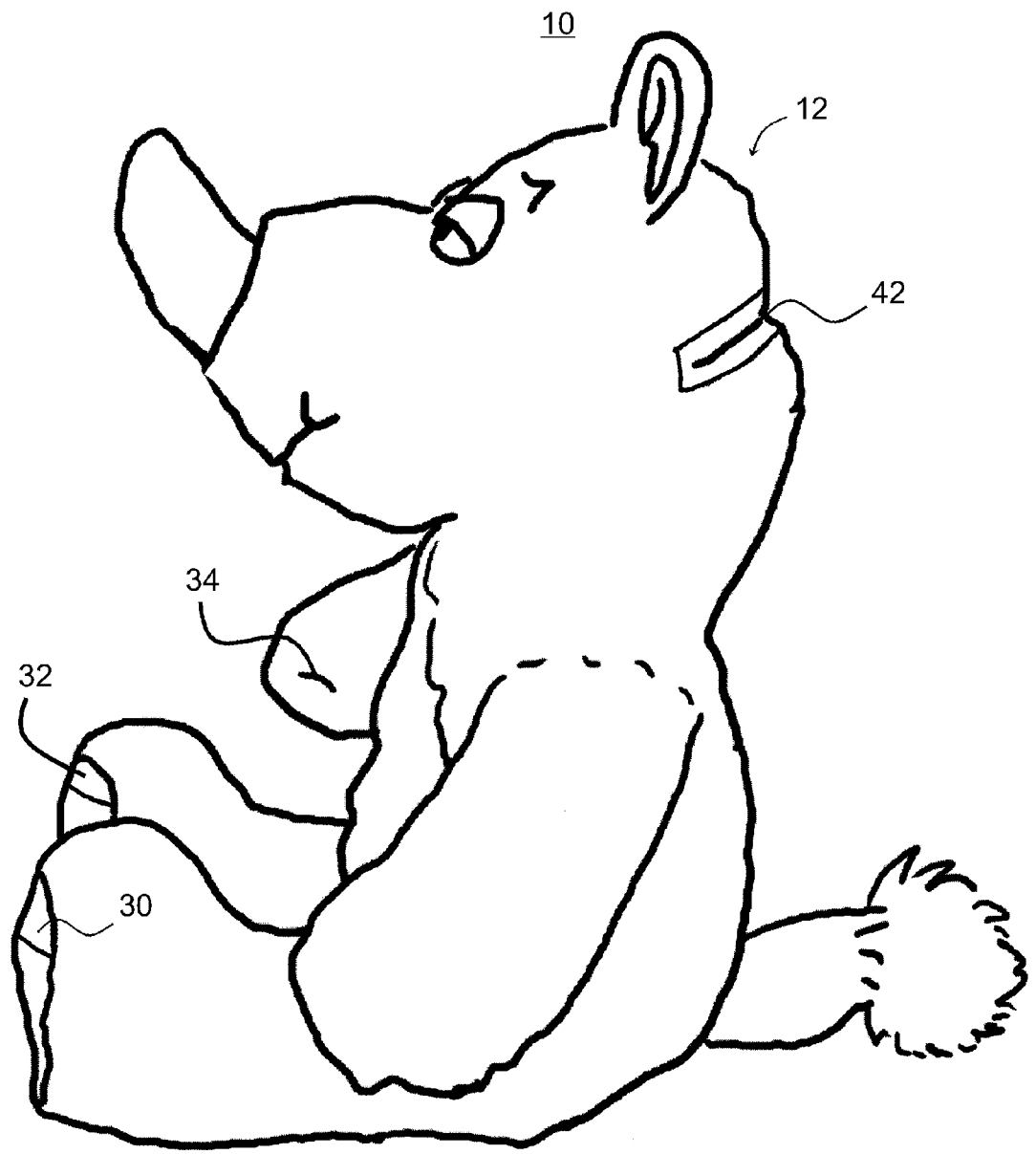
FIG. 4 illustrates a side view of another representative embodiment of a communication device of the present invention, wherein a pocket is disposed on the backside of the head of the communication device in accordance with some embodiments of the present invention.
Figure 5:
FIG. 5 illustrates another frontal view of another representative embodiment of a communication device of the present invention.
Figure 6:
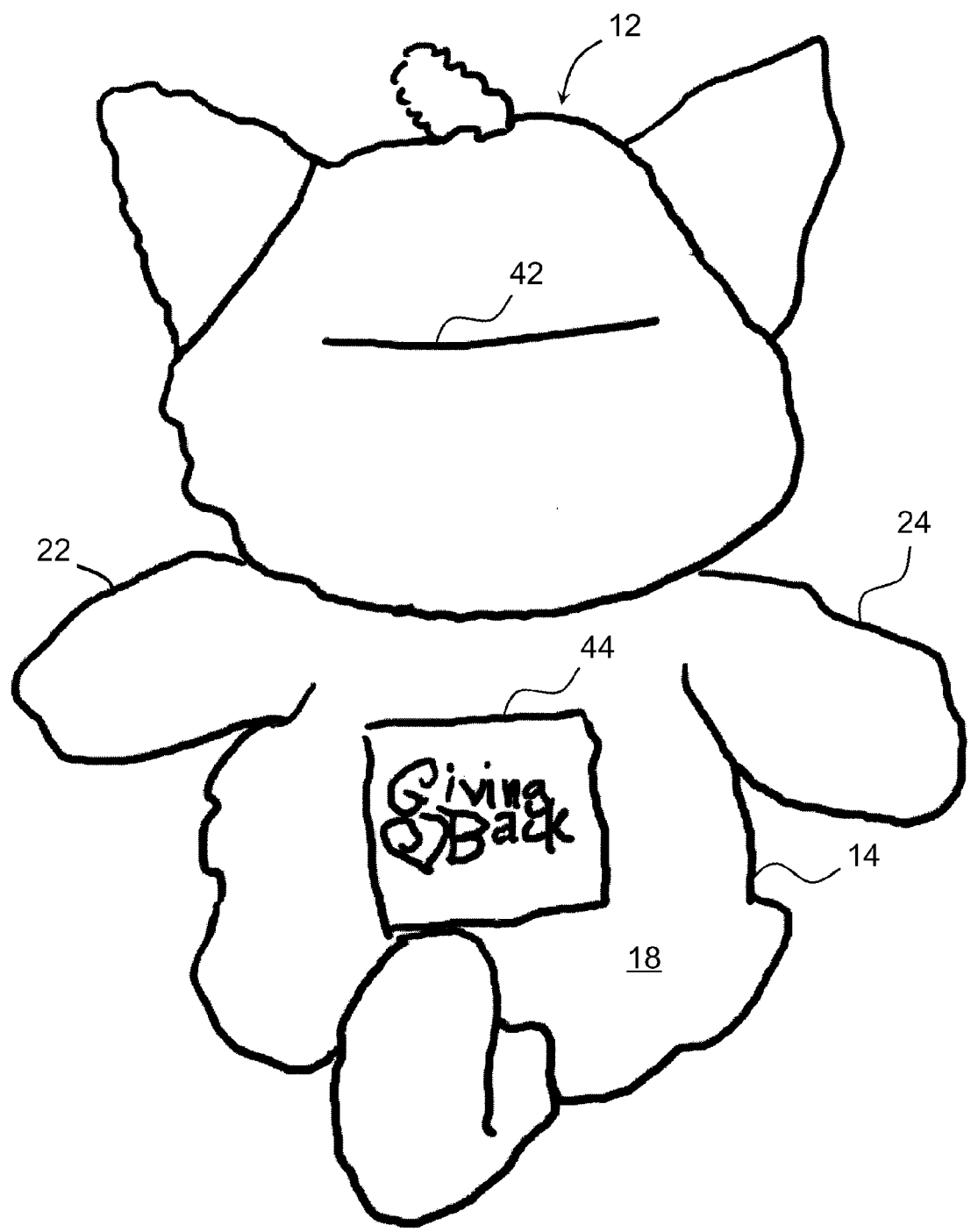
FIG. 6 illustrates a view of the backside of the representative embodiment of FIG. 5, wherein a pocket is disposed on the backside of the body of the communication device in accordance with some embodiments of the present invention.

As illustrated in FIGS. 1-9, the pockets may be configured in any suitable shape, size, configuration, style, or location. Moreover, the pockets may be stylized in any suitable way including various shapes, designs, colors, patterns, monograms, embroidering and the like. For example, as depicted in FIGS. 3, 5, and 6, the pockets may be embroidered with inspiring words or phrases 51 such as "I Am Capable of Greatness," "Capables," "Stand Tall," "Giving Back" and the like. Similarly, the pockets may be embroidered with various designs such as hearts and the like. While the pockets 30, 32, 34, 36, 40, 42, and 44 are shown in discrete locations, one of skill in the art will appreciate that other embodiments of the communication device of the present invention may include numerous additional pockets disposed at multiple locations suitable for practicing the invention. The operation and significance of the pockets will be discussed in greater detail below.

Those skilled in the art will appreciate that embodiments of the communication device 10 of the present invention may take many other forms and shapes. Accordingly, while the communication device 10 is depicted as a plush or stuffed toy form 12 in FIGS. 1-9, the communication device 10 may take any suitable form for practicing the invention. For example, in some embodiments, the communication device 10 will take a form suitable for babies, toddlers, or young children. Such embodiments may include plush or stuffed toy forms with soft features. For example, the toy form may be furry, cuddly, plump, or stuffed. Similarly, the toy form may be oversized having cartoonish or otherwise funny features such as large round eyes, big teeth, a bulbous nose, oversized appendages and the like. Alternatively, the toy form may be very small. For example, the toy form may be small enough for a child to carry in his or her pocket. In some embodiments, the toy form may be covered in hair, fur, scales, silk, leather, or other synthetic materials. In other embodiments, the toy form may be more rigid. Such embodiments may have movable joints at the appendages and may include internal wires and the like to maintain specific shapes, poses, or stances. In still other embodiments, the toy form may have animal features such as paws, a tail, ears, tusks, horns, scales, fur, a mane, teeth and the like. In still other embodiments, the toy form may have dolly or action hero type features such as clothing, shoes, jewelry, hats, masks, capes, tools and the like.

Alternatively, in some embodiments, the communication device 10 may take a form suitable for older children, youth, and adolescents. In such embodiments, the communication device may be in other toy forms (not shown) or constitute other physical objects (not shown) having pockets disposed on the alternative toy forms or physical objects. In other embodiments, the communication device 10 may take a form suitable for teenagers, young adults, and mature adults. In such embodiments, the communication device may constitute other physical objects (not shown) having pockets or equivalent features incorporated therein. For example, in some embodiments, the communication device may be a decorative box (not shown) having one or more drawers disposed therein. In other embodiments, the communication device 10 may take other alternative forms without departing from the spirit or essential characteristics of the present invention.

Communication Symbols

As mentioned previously, in some embodiments of the present invention the pockets discussed above are adapted to receive one or more communication symbols. The communication symbols are configured to be placed into and withdrawn from the pockets. In such embodiments, there may be multiple communication symbols used simultaneously or over a period of time. Alternatively, as few as a single communication symbol may be employed in practicing the invention.

The communication symbols are embodiments of messages shared between the first and second communicators. The symbols may take any form adapted to represent a topic about which the communicators are attempting to converse. Some non-limiting examples of such topics may include schooling, parenting, relationships, planning, goals, training, thoughts, feelings, actions and so forth. In some embodiments, the communication symbols may be predefined. In such embodiments, the communication symbols are acquired in advance and may be purchased. Further, in such embodiments, the first and second communicators select the predefined communication symbol corresponding to the topic they wish to discuss from those communications symbols which were previously acquired or purchased.

In other embodiments, the communication symbols may be created by either the first or the second communicator or by both of them. In such embodiments, the communication symbols may be created, for example, by providing one communicator with a blank writing surface and a writing implement such that the communicator can express in writing topics about which they would like to converse. Alternatively, in some embodiments, the communication symbols may not be written. For example, in some embodiments, the communication symbols may be physical objects which symbolically represent topics the communicators would like to discuss. In such embodiments, the objects may either be acquired or created.

Whether the communication symbols are acquired from a predefined set or created by the communicators, the communicators may use a single communication symbol at a time or they may use multiple communication symbols simultaneously. Similarly, over time the same communication symbols can be used repeatedly or new symbols can be acquired or created. The operation and significance of the communication symbols will be discussed further below.

Cape

Figure 12:
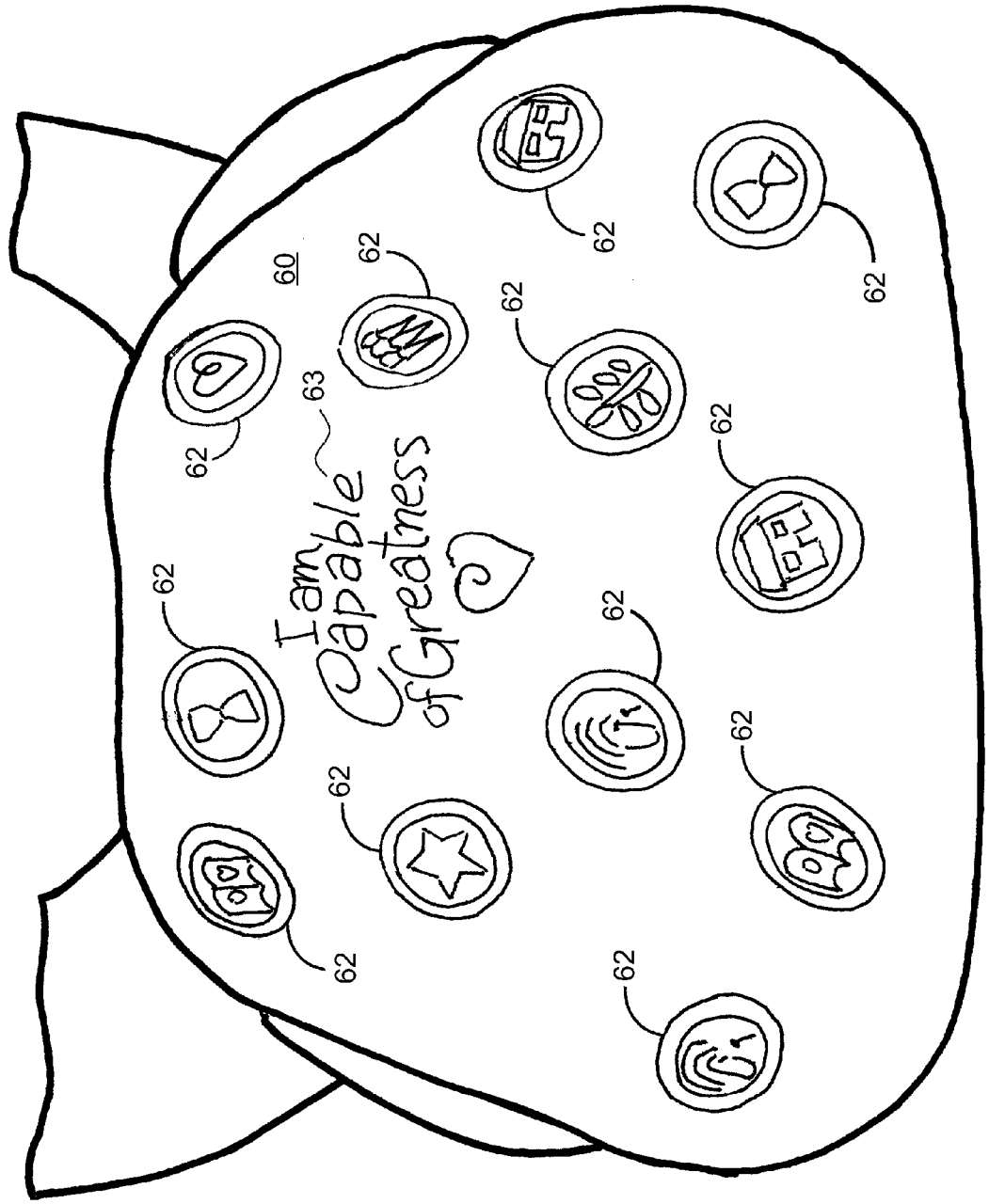
FIG. 12 illustrates a representative cape disposed adjacent the head of a plush toy communication device in accordance with some embodiments of the present invention.

Turning to FIG. 12, in some embodiments the communication device 10, in the form of a plush or stuffed toy 12, may include a removable cape 60 disposed adjacent the head 20 on the plush toy 12. As depicted further in FIG. 12, in some embodiments, the cape 60 may receive numerous badges of honor 62. The badges of honor include symbols adapted to represent various values. Some non-limiting examples of such values may include love, appreciation, listening, patience, communication, self-control, helping, learning, health, fitness, excellence, environmental responsibility, reverence, safety, patriotism, integrity, honor, discipline, hope, fortitude, kindness, compassion, accountability, and so forth. The cape 60 and the badges of honor 62 may be stylized in any suitable way including various shapes, designs, colors, patterns, monograms, embroidering and the like. For example, as depicted in FIG. 12, the cape may be embroidered with inspiring words or phrases 63 such as "I Am Capable of Greatness," incorporating various designs and the like. Similarly, as further depicted in FIG. 12, the badges of honor may be embroidered with various symbolic images and designs. Moreover, a single badge of honor or multiple badges may be employed in practicing the invention.

In some embodiments, the cape 60 is used as a teaching incentive device or means. In such embodiments, the cape 60 is given to the second communicator to selectively attach to the communication device 10. The first and second communicators may then define acts of good behavior which the second communicator is to perform. Similarly, acts of bad behavior which the second communicator is to avoid may be defined. The second communicator may then earn badges of honor 62 by engaging in the acts of good behavior as previously defined between the two communicators. This process may continue until a specified number of badges of honor have been selectively granted to the second communicator. If the second communicator earns a set number of badges of honor, the cape 60 may then be retired and retained by the second communicator as a symbol of his or her accomplishments. However, if the second communicator engages in the acts of bad behavior as previously defined between the two communicators, the first communicator may selectively deny or revoke some or all of the badges of honor previously awarded to the second communicator. In this manner, the second communicator is incentivized to engage in good behaviors and avoid bad behaviors continuously.

Pockets

Figure 7:
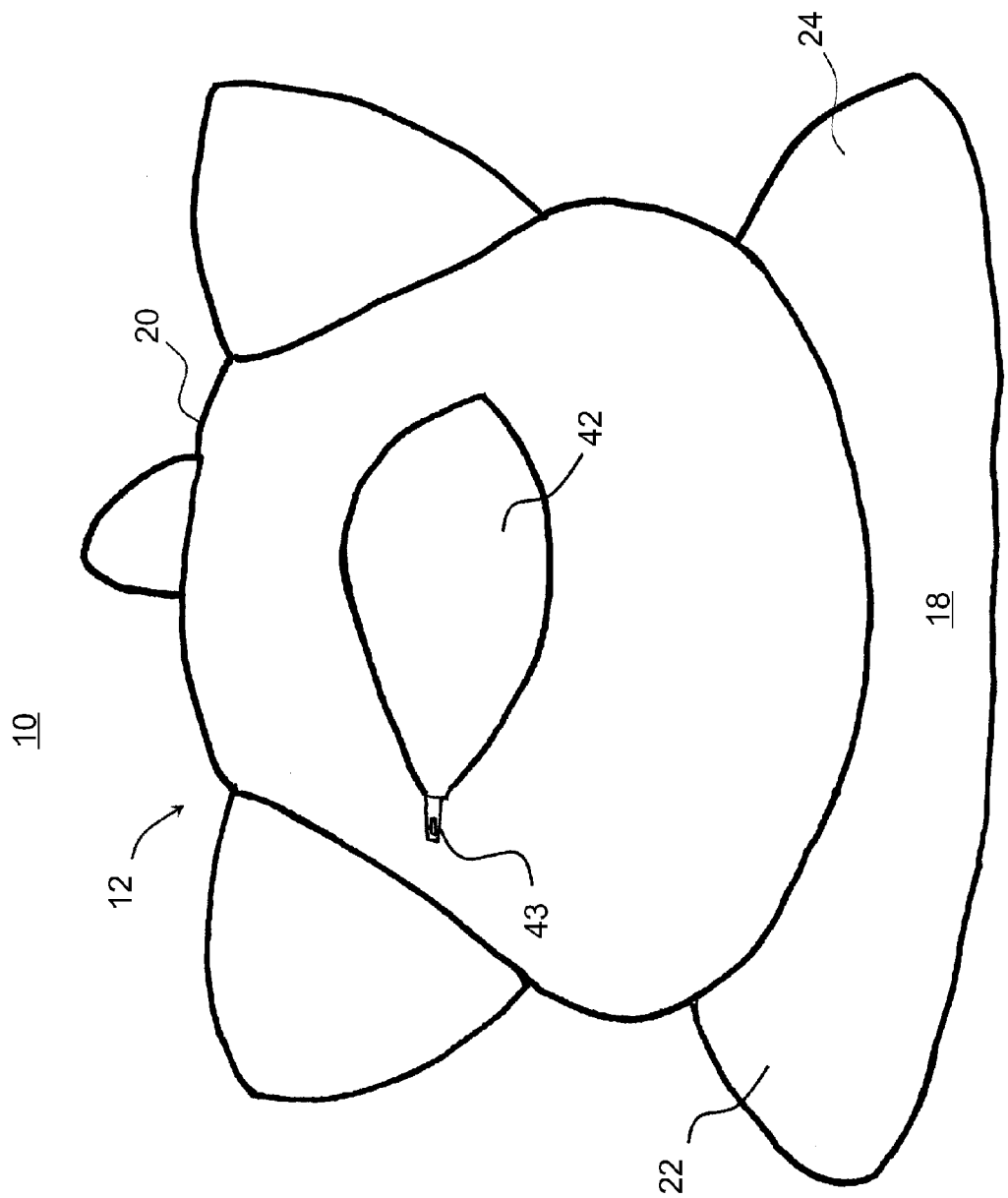
FIG. 7 illustrates the representative embodiment of FIGS. 5 and 6 with the pocket disposed on the head of a plush toy communication device in an open position.

The appendages and pockets associated with various embodiments of the present invention will now be discussed in greater detail with continued reference to the figures. Referring to FIGS. 4, 6, and 7, a representative non-limiting embodiment is illustrated. In FIGS. 4, 6, and 7, communication device 10 is provided having a pocket 42 disposed on the head 20 of the plush or stuffed toy form 12. In FIGS. 4 and 6, the pocket 42 is in a closed position. In FIG. 7, the pocket 42 is in an open position. The pocket 42 may be opened and closed repeatedly in accordance with practicing the invention. In some embodiments, the pocket 42 may be secured in a closed position using a zipper 43. In other embodiments, the pocket 42 may be secured in a closed position using Velcro (hook and loop fasteners), clasps, buckles, catches, hook and eye fasteners, tie strings, buttons, clips, snaps, flaps, or other suitable fasteners. In still other embodiments, the pocket 42 may not include any means for securing it in a closed position but rather the pocket may simply remain open.

As discussed previously, the pocket 42 may be adapted to receive one or more communication symbols (not shown). The communication symbols are configured to be placed into and withdrawn from the pocket 42. This process of placing and withdrawing the communication symbols can occur repeatedly or as desired. The pocket 42 is located in the head 20 of the communication device 10 to symbolically represent or define the mind or thought center of the plush toy 12. This location is symbolically adapted to be a metaphor for the second communicator's mind, brain, or thought center. Similarly, this location is adapted to employ a play on words wherein the pocket 42 of the plush toy 12 is referred to as either a "think-a-head" or "plan-a-head" pocket symbolically representing methods of thought management associated with the pocket 42.

Various communication symbols may be placed into and withdrawn from the pocket 42 for a myriad of purposes and/or reasons. In some embodiments, communication symbols can be selected and placed into the pocket 42 to represent thoughts of the second communicator. In such embodiments, bad or negative thoughts can be incorporated into a first communication symbol or a first communication symbol which represents such thoughts can be selected. The symbol may then be then placed into the pocket 42 to symbolically represent the bad or negative thoughts of the second communicator. The first communication symbol can then be removed and subsequently destroyed. The removal and destruction of the first communication symbol which embodies the bad or negative thoughts is a metaphor representing the second communicator's ability to eliminate bad or negative thoughts from his or her mind merely by choosing to do so. This process also allows the second communicator to visualize the process of eliminating bad or negative thoughts from his or her mind. The second communicator may destroy the first communication symbol in any suitable way.

Further, in such embodiments, good or positive thoughts can then be incorporated into a second communication symbol or a second communication symbol which represents such thoughts can be selected. Again, the symbol may then be placed into the pocket 42 to symbolically represent the good or positive thoughts of the second communicator. The second communication symbol embodying good or positive thoughts is a metaphor representing the second communicator's ability to choose such thoughts. Again, this process helps the second communicator to visualize his or her choice to think good or positive thoughts. Through this process, repeated as necessary, the second communicator receives instruction regarding control over one's thoughts or thought management.

In other embodiments, communication symbols can be selected and placed into the pocket 42 to represent goals, plans, or ambitions of the second communicator. In such embodiments, goals, plans, or ambitions can be incorporated into a communication symbol or a communication symbol which represents such things can be selected. The symbol may then be placed into the pocket 42 to symbolically represent the goals, plans, or ambitions of the second communicator. The communication symbol embodying such things is a metaphor representing the second communicator's ability to set goals, make plans, and achieve ambitions. Consistent with such embodiments, the communication symbol may be repeatedly and periodically removed from the pocket 42, reviewed by the second communicator, and subsequently returned to the pocket 42. Through this process, repeated as necessary, the second communicator can set goals and make plans and systematically be reminded of the steps necessary to achieve them. Likewise, the second communicator can chart or monitor his or her progress in completing a given plan or achieving a specific goal.

In other embodiments, communication symbols can be selected and placed into the pocket 42 to represent feelings or encouraging thoughts from the first communicator. In such embodiments, consistent with the steps described above, the first communicator may incorporate words of love, affection, encouragement, praise and the like into a communication symbol or select a communication symbol which represents such feelings. The symbol may then be placed into the pocket 42 for the benefit of the second communicator. In this manner, the second communicator can be encouraged in his or her efforts to think good thoughts and set appropriate goals or make appropriate plans. Similarly, the second communicator can be encouraged in his or her efforts to engage in good behavior.

With continued reference to FIGS. 6 and 7, communication device 10 is provided having a pocket 44 disposed on the back side 18 of the body 14 of the plush or stuffed toy form 12. Similar to the pocket 42 discussed previously, pocket 44 may be open some or all of the time or it may be selectively closed and reopened by the means discussed above. Likewise, the pocket 44 may also be adapted to receive one or more communication symbols repeatedly or as desired.

The pocket 44 is located in the back side 18 of the communication device 10 to symbolically represent or define the back of the plush toy 12. This location is symbolically adapted to be a metaphor for the second communicator's back and his or her strength or ability to bear loads and burdens in service to others. Similarly, this location is adapted to employ a play on words wherein the pocket 44 of the plush toy 12 is referred to as the "giving back" pocket symbolically representing methods of encouraging service to others associated with the pocket 44.

As with pocket 42 discussed above, various communication symbols may be placed into and withdrawn from the pocket 44 for a myriad of purposes and/or reasons. In some embodiments, communication symbols can be selected and placed into the pocket 44 to represent acts of service already rendered to others by the second communicator. In other embodiments, communication symbols can be selected and placed into the pocket 44 to represent acts of service the second communicator has yet to perform for others. In still other embodiments, the first communicator may incorporate words of praise or reminders of blessings experienced by the second communicator and the like into a communication symbol and place the symbol inside the pocket 44 to encourage the second communicator. In this manner, the second communicator can be encouraged in his or her efforts to serve and/or give to others who are less fortunate. Similarly, the second communicator can be reminded of his or her personal blessings. Through this process, repeated as necessary, the second communicator receives instruction adapted to avert a sense of entitlement.

With reference now to FIGS. 1-3, and 5, a further representative non-limiting embodiment is illustrated. In FIGS. 1-3, and 5, communication device 10 is provided having a pocket 36 disposed on the front side 16 of the body 14 of the plush or stuffed toy form 12. Similar to the pockets discussed previously, pocket 36 may be open some or all of the time or it may be selectively closed and reopened by the means discussed above. Likewise, the pocket 36 may also be adapted to receive one or more communication symbols repeatedly or as desired.

The pocket 36 is located in the front side 16 of the communication device 10 to symbolically represent or define the bosom or chest of the plush toy 12. This location is symbolically adapted to be a metaphor for the second communicator's heart or hope oriented center.

As with the pockets previously discussed, various communication symbols may be placed into and withdrawn from the pocket 36 for a myriad of purposes and/or reasons. In some embodiments, communication symbols can be selected and placed into the pocket 36 to represent the dreams, hopes, goals, or aspirations of the second communicator. In such embodiments, dreams, hopes, goals, or aspirations can be incorporated into a communication symbol or a communication symbol which represents such things can be selected. The symbol may then be placed into the pocket 36 to symbolically represent the dreams and hopes of the second communicator.

In such embodiments the symbol is a metaphor representing the dreams and hopes contained in the second communicator's heart. Consistent with such embodiments, the communication symbol may be repeatedly and periodically removed from the pocket 36, reviewed by the second communicator, and subsequently returned to the pocket 36. Through this process, repeated as necessary, the second communicator may visualize his or her goals as a first step to achieving them. Likewise, the second communicator can monitor his or her progress in doing so.

Figure 10:
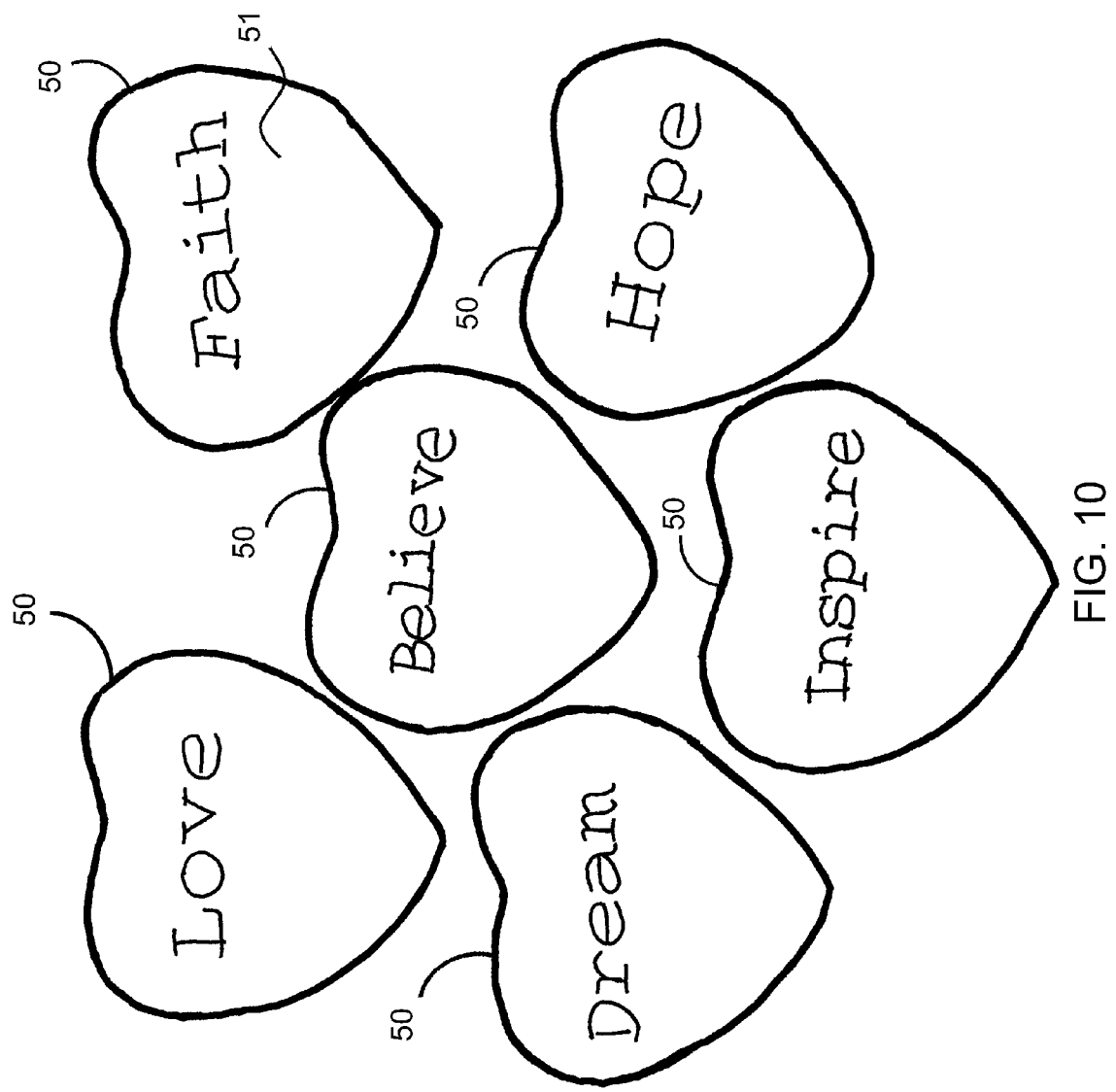
FIG. 10 shows several symbolic hearts adapted to be used with a communication device in accordance with some embodiments of the present invention.
Figure 11:
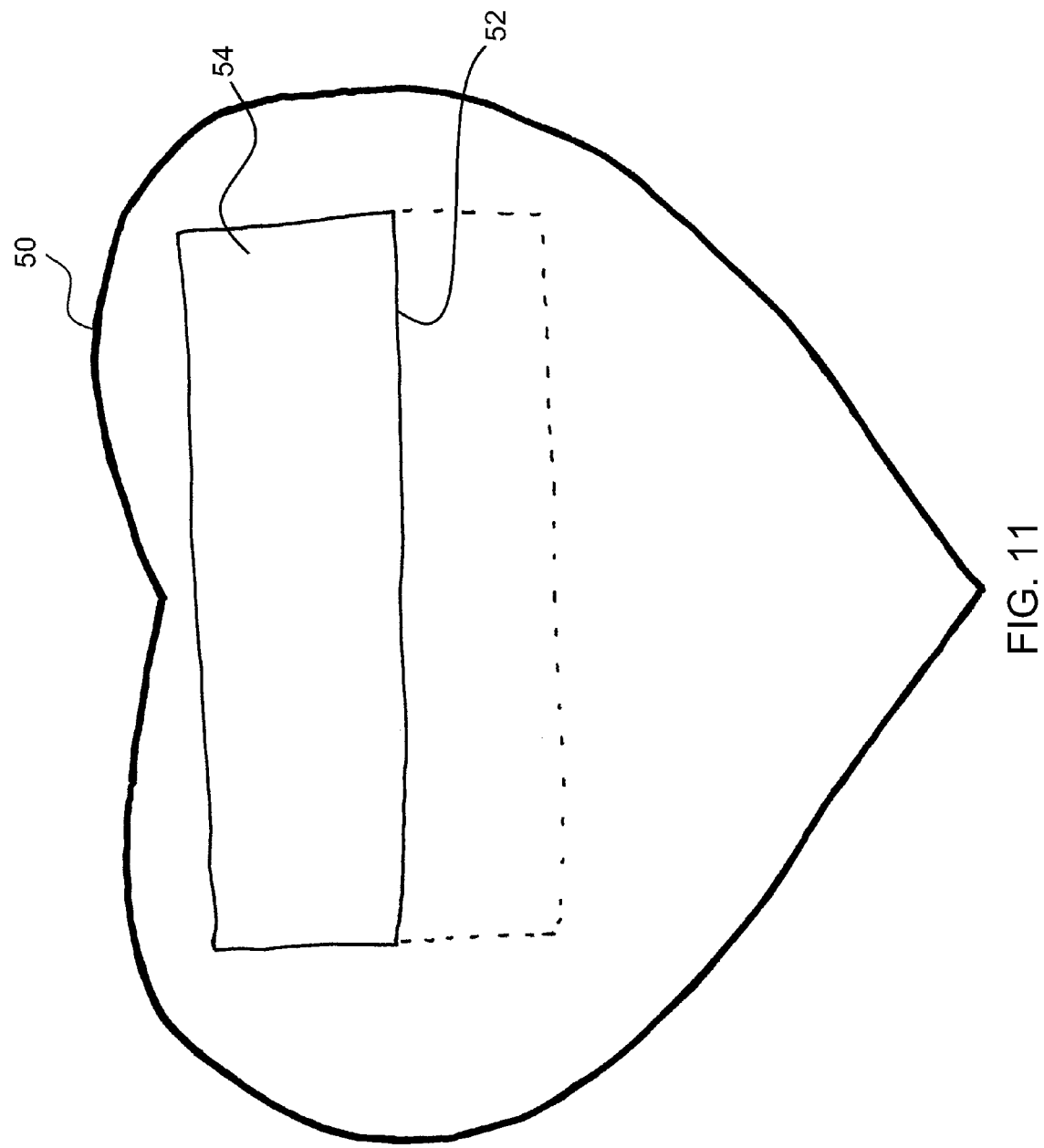
FIG. 11 illustrates a representative pocket disposed on a symbolic heart adapted to be used with a communication device in accordance with some embodiments of the present invention.

In other embodiments, the pocket 36 may be adapted to receive one or more selectively removable and interchangeable symbolic hearts. With reference to FIGS. 10 and 11, representative non-limiting embodiments of such hearts are illustrated at 50. The hearts 50 may be stylized in any suitable way including various shapes, designs, colors, patterns, monograms, embroidering and the like. For example, as depicted in FIG. 10, the hearts 50 may be embroidered with inspiring words or phrases 51 such as faith, believe, love, dream, inspire, hope, and the like. In this manner, the hearts 50 may constitute a communication symbol directly. Likewise, the hearts may be configured in any suitable shape, size, configuration, or style and they may be constructed out of any suitable material. Typically, the hearts may be soft pillows styled in the shape of a traditional fanciful heart as depicted in FIGS. 10 and 11. In addition, as depicted in FIG. 11, in some embodiments, the hearts 50 also contain a pocket 52 similar to the pockets previously described. Accordingly, a separate communication symbol 54 may be incorporated into the hearts 50.

The hearts 50 maintain the metaphor previously discussed with reference to pocket 36 in general. Further, the hearts, including the pockets disposed therein, are used in a manner consistent with the discussion of pocket 36 above. The hearts 50 can be used one at a time in accordance with some embodiments of the present invention or multiple hearts 50 can be used simultaneously in accordance with other embodiments. In addition, a heart 50 may also be used as a separate and distinct communication device employed to enhance communication and thereby facilitate the teaching of desired behaviors, values, principles, and skills as discussed above.

With reference now to FIGS. 1-5, a further representative non-limiting embodiment is illustrated. In FIGS. 1-5, communication device 10 is provided having one or more pockets 30 and/or 32 disposed on the distal end of the one or more lower extremities 26 and/or 28 of the plush or stuffed toy form 12. Similar to the pockets discussed previously, pockets 30 and 32 may be open some or all of the time or they may be selectively closed and reopened by the means discussed above. Likewise, the pockets 30 and 32 may also be adapted to receive one or more communication symbols repeatedly or as desired.

The pockets 30 and 32 are located in the distal ends of the lower extremities of the device 10 to symbolically represent or define the foot or foundation of the plush toy 12. This location is symbolically adapted to be a metaphor for the second communicator's personal foundation of fundamental life values and principles.

As with the pockets previously discussed, various communication symbols may be placed into and withdrawn from the pockets 30 and 32 for a myriad of purposes and/or reasons. In some embodiments, communication symbols can be selected and placed into the pockets 30 and/or 32 to represent the values the second communicator promotes or stands for. In such embodiments, values can be incorporated into a communication symbol or a communication symbol which represents desired values can be selected. The symbol may then be placed into either or both of the pockets 30 or 32 to symbolically represent the values the second communicator champions. In such embodiments, the symbol is a metaphor representing the foundational principles and values of the second communicator. Consistent with such embodiments, the communication symbol may be repeatedly and periodically removed from the pockets 30 and/or 32, reviewed by the second communicator, and subsequently returned to the pockets. Through this process, repeated as necessary, the second communicator may be symbolically and perpetually reminded of the essential values the first communicator wishes to instill.

With reference now to FIGS. 1, 3-5, and 8-9, a further representative non-limiting embodiment is illustrated. In FIGS. 1, 3-5, and 8-9, communication device 10 is provided having one or more pockets 34 and/or 40 disposed on the distal end of the one or more upper extremities 22 and/or 24 of the plush or stuffed toy form 12. Similar to the pockets discussed previously, pockets 34 and 40 may be open some or all of the time or they may be selectively closed and reopened by the means discussed above. Likewise, the pockets 34 and 40 may also be adapted to receive one or more communication symbols repeatedly or as desired.

The pockets 34 and 40 are located in the distal ends of the upper extremities 22 and 24 of the device 10 to symbolically represent or define the hands or paws of the plush toy 12. This location is symbolically adapted to be a metaphor for the second communicator's hands. Similarly, this location is adapted to employ a play on words wherein the pockets 34 and 40 of the plush toy 12 are employed in a self-evaluation and awareness method used in connection with the phrases "paws [i.e., pause] to examine feelings," "I feel right," and "on the other hand."

Figure 8:
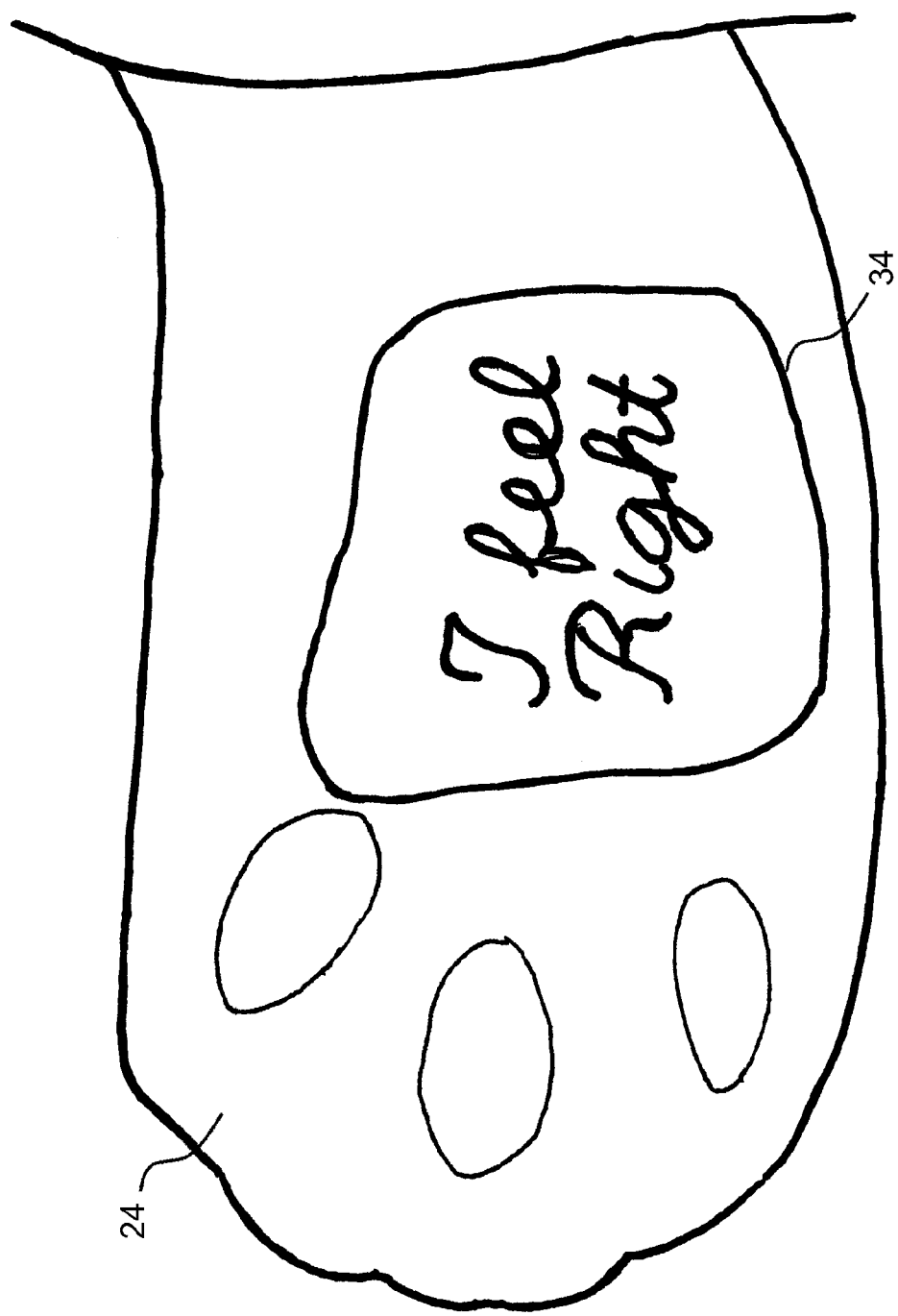
FIG. 8 illustrates a representative pocket disposed on one of the upper extremities of a communication device in accordance with some embodiments of the present invention.
Figure 9:
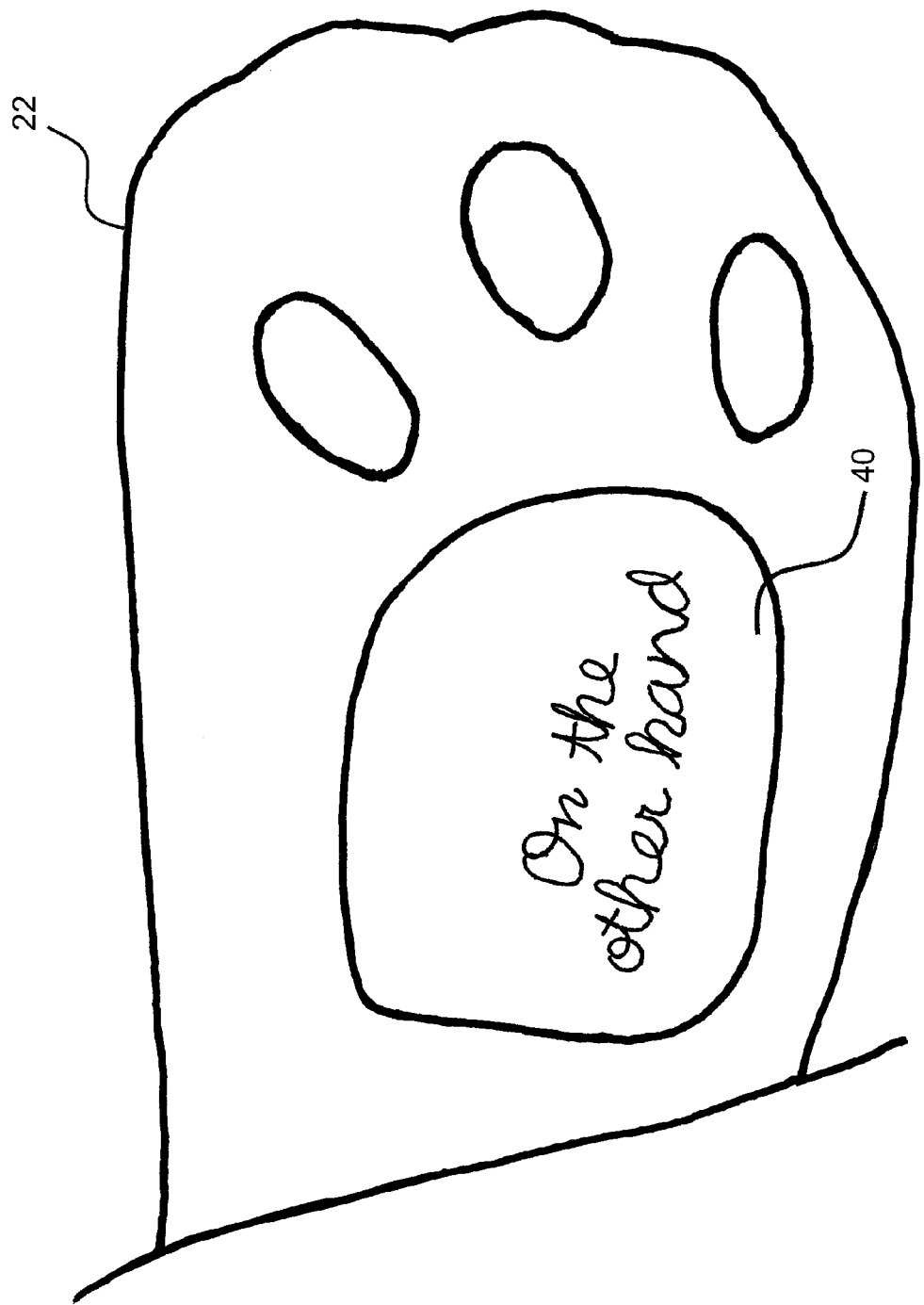
FIG. 9 illustrates another representative pocket disposed on one of the upper extremities of a communication device in accordance with some embodiments of the present invention.

With reference specifically to FIG. 8, in some embodiments, the pocket 34 on upper extremity 24 may be embroidered with the phrase "I feel right." Similarly, with reference to FIG. 9, the pocket 40 on upper extremity 22 may be embroidered with the phrase "on the other hand."

As with the pockets previously discussed, various communication symbols may be placed into and withdrawn from the pockets 34 and 40 for a myriad of purposes and/or reasons. In some embodiments, communication symbols can be selected and placed into pocket 34 to represent the emotional feelings of the second communicator. In such embodiments, the second communicator's feelings can be incorporated into a communication symbol or a communication symbol which represents such feelings can be selected. The symbol may then be placed into pocket 34 to symbolically represent the feelings of the second communicator. Accordingly, the pocket 34 is embroidered with the phrase "I feel right" indicating that from the second communicator's perspective regarding a given event or situation he or she may believe that his or her feelings are right or otherwise correct. In such embodiments, the symbol is a metaphor representing the articulation of the second communicator's feelings.

Figure 13:
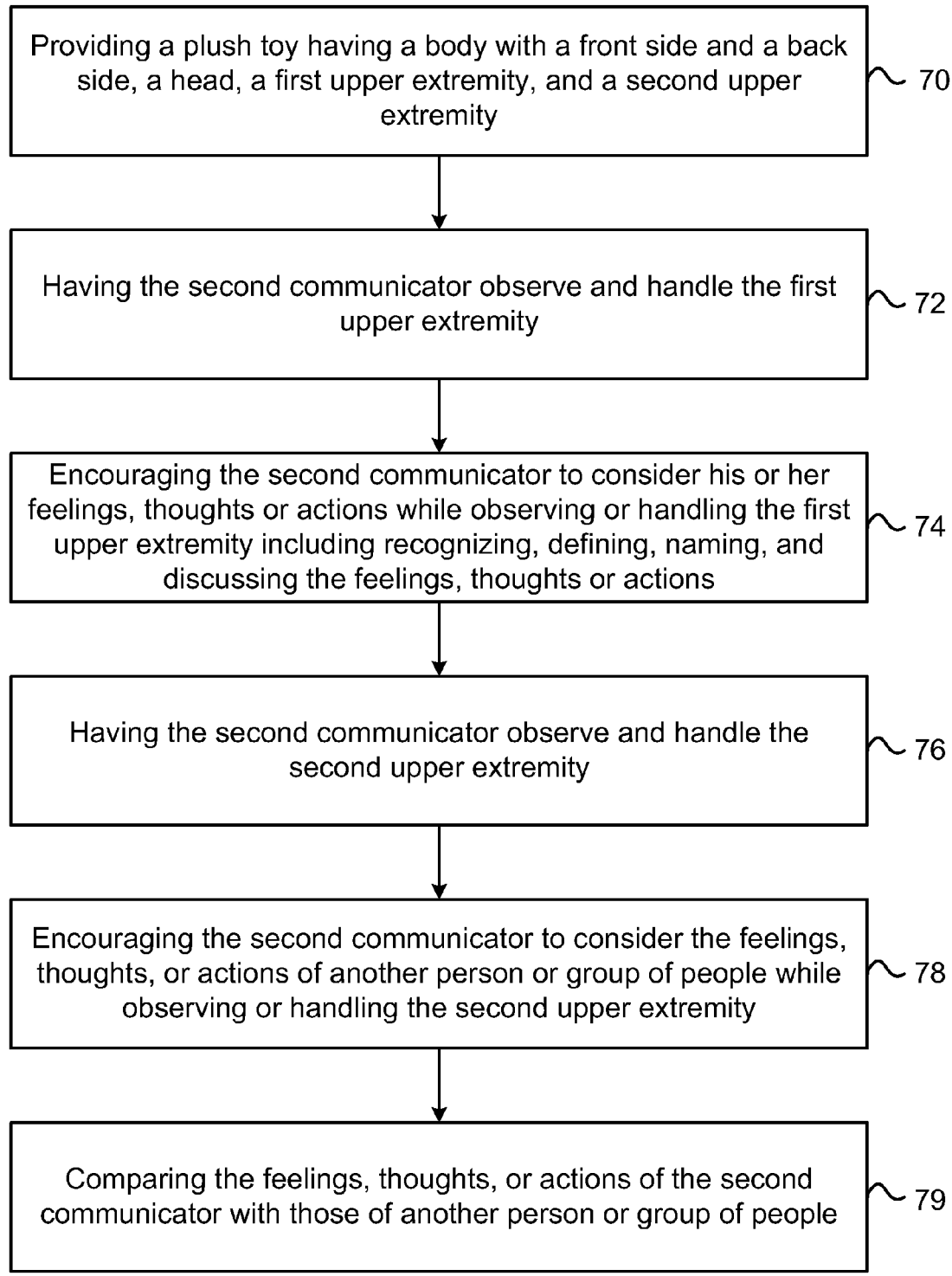
FIG. 13 shows a representative flow diagram that illustrates an example sequence that may be used to facilitate teaching self-awareness, other-awareness, self-management, and relationship management.

In some embodiments, incorporating the second communicator's feelings into a communication symbol or selecting a symbol that represents such feelings may include several steps. In such embodiments, these steps facilitate communication and instruction between the first and second communicators with regard to understanding emotions and feelings following an event that has cause the second communicator to become angry, sad, mad, or otherwise upset. With reference to FIG. 13, these steps are as follows. First, at block 70, a plush toy 12 is provided according to some embodiments of the present invention as discussed above. At block 72, the second communicator is instructed to observe and handle a first upper extremity 24. The second communicator is encouraged to observe and handle the first upper extremity 24 to visually and physically interpose a thought process between the upsetting event and the second communicator's subsequent thoughts, feelings and/or actions. While the second communicator observes and handles the first upper extremity 24, the second communicator is encouraged at block 74 to consider his or her feelings thoughts and/or actions with regard to the upsetting event. The step at block 74 further includes encouraging the second communicator to recognize, define, name, and discuss his or her thoughts feelings or actions. In this manner, the second communicator can be instructed to enhance his or her understanding of emotions and feelings. Accordingly, the second communicator's feelings can be incorporated into a communication symbol or a symbol can be selected that represents such feelings.

In other embodiments, communication symbols can be selected and placed into pocket 40 to represent the emotional feelings of another person or group of people. In such embodiments, the feelings of another person or group of people can be incorporated into a communication symbol or a communication symbol which represents such feelings can be selected. The symbol may then be placed into pocket 40 to symbolically represent the feelings of the other person or group of people. Accordingly, the pocket 40 is embroidered with the phrase "on the other hand" indicating that there are other points of view beyond those of the second communicator which should be considered. In such embodiments, the symbol is a metaphor representing the articulation of the feelings of another person or group of people.

In some embodiments, incorporating the feelings of another person or group of people into a communication symbol or selecting a symbol that represents such feelings may include several additional steps. In such embodiments, these steps further facilitate communication and instruction between the first and second communicators with regard to understanding emotions and feelings of others following an event that has cause the second communicator to become angry, sad, mad, or otherwise upset. With continued reference to FIG. 13, these steps are as follows. At block 76, the second communicator is instructed to observe and handle a second upper extremity 22. The second communicator is encouraged to observe and handle the second upper extremity 22 to further visually and physically interpose a thought process between the upsetting event and the second communicator's subsequent thoughts, feelings and/or actions. While the second communicator observes and handles the second upper extremity 22, the second communicator is encouraged at block 78 to consider the feelings thoughts and/or actions of others with regard to the upsetting event. The step at block 78 further includes encouraging the second communicator to recognize, define, name, and discuss the thoughts feelings or actions of others. In this manner, the second communicator can be instructed to enhance his or her understanding of emotions and feelings. Accordingly, the feelings of another person or group of people can be incorporated into a communication symbol or a symbol can be selected that represents such feelings. At block 79, the second communicator is instructed to compare his or her feelings, thoughts or actions with those of the other person or group of people. Through this process, repeated as necessary, the second communicator may receive instruction about self-awareness, other-awareness, self-management, and relationship management.

By way of summary, the following example is provided to elucidate how the steps previously discussed may be implemented in some embodiments. Implementation of the present invention may occur when a dispute arises between a second communicator, such as a child, and a third party, such as another child. For example, the second communicator and the third party may be involved in a dispute, fighting, or otherwise engaged in an upsetting event. Under circumstances akin to those described, a communication process may be implemented between the first and second communicator to assist the second communicator in resolving the dispute or upsetting event in the following way.

First, a communication device 10, such as a plush toy 12 as described above, having a first upper extremity 24 and a second upper extremity 22 may be provided. The upper extremities 22 and 24 may include pockets 34 and 40 which may be sized and configured to receive one or more communication symbols as discussed above. The process continues as the second communicator observes and handles the first upper extremity 24. The first upper extremity 24 symbolically represents the second communicator's point of view with regard to an upsetting event, such as why the second communicator feels justified in fighting with others for example. As the second communicator observes and handles the first upper extremity 24, he or she is encouraged to consider his or her feelings, thoughts, or actions. This may include recognizing, defining, and naming the second communicator's feelings, thoughts, or actions. In addition, as the second communicator is observing and handling the first upper extremity 24, the first and second communicator may discuss the second communicator's feelings or thoughts about his or her actions. Accordingly, the first communicator may assist the second communicator in understanding his or her emotions and coping with them in a constructive manner. Further, this process of employing the first upper extremity 24 of the communication device serves to visually and physically interpose a thought process between the upsetting event and the second communicator's subsequent thoughts, feelings and/or actions.

The process continues as the second communicator observes and handles the second upper extremity 22. The second upper extremity symbolically represents the third party's point of view with regard to the upsetting event, such as why the third party engaged in conduct upsetting to the second communicator for example. As the second communicator observes and handles the second upper extremity 22, he or she is encouraged to consider the feelings, thoughts, or actions of the third party. In addition, as the second communicator is observing and handling the second upper extremity 22, the first and second communicator may discuss the third party's feelings, thoughts, or actions. The process is completed as the first and second communicators discuss and compare the feelings, thoughts, or actions of the second communicator resolved above with those of the third party. Accordingly, the first communicator may assist the second communicator in understanding the emotions of others and how to address such emotions.

The foregoing communication process is adapted to facilitate teachings of self-awareness, other-awareness, self-management, and relationship management by opening up a channel of amicable communication or dialogue between two communicators. Through the forgoing process, the second communicator learns to calmly evaluate his or her personal feelings, thoughts, and actions and those of other people without behaving rashly.

While the process described above may be practiced by a first communicator and a second communicator together, it may also be practiced by a second communicator independently. For example, if the second communicator becomes upset with regard to a particular situation or event, the second communicator can employ the communication device and the steps discussed above with reference to FIG. 14 by himself or herself. In this manner, the second communicator can continue to develop discipline and awareness independently.

In addition to the features and characteristics previously described, some embodiments of the communication device 10 may also include one or more of the following features. For example, the communication device may include an electronic audio playback device or component. The audio playback component may be adapted to record and playback various message consistent with the objectives of the present invention. Such recordings may be contemporaneously made and played back or they may have been previously recorded and incorporated into the communication device.

In some embodiments, the communication device may also include a recording system adapted to work in concert with the audio playback device described above. Alternatively, the recording system may operate independently therefrom. In other embodiments, the communication device may include an alternative electronic device that is adapted to encode and/or decode video and audio signals, files, and/or digital streams. For instance, one non-limiting example of an audio playback and/or recording component may be an MP3, MP4, .WAV, or QuickTime player or other digital audio recorder. In such embodiments, the recorder and playback components could be used to create messages and other communications to further encourage and enhance teaching of desired behaviors, values, principles and skills.

In still other embodiments, the communication device may also include a safety oriented device. Such a device may be adapted to send a wireless signal, message, or notification. For example, the safety device may be able to place a wireless phone call during an emergency. Similarly, the device may be able to detect an emergency such as a fire and place a wireless phone call accordingly. Likewise, the safety device may be able to send other cellular based signals such as text messages and the like or Internet based signals such as "tweets" and so forth.

Figure 14:
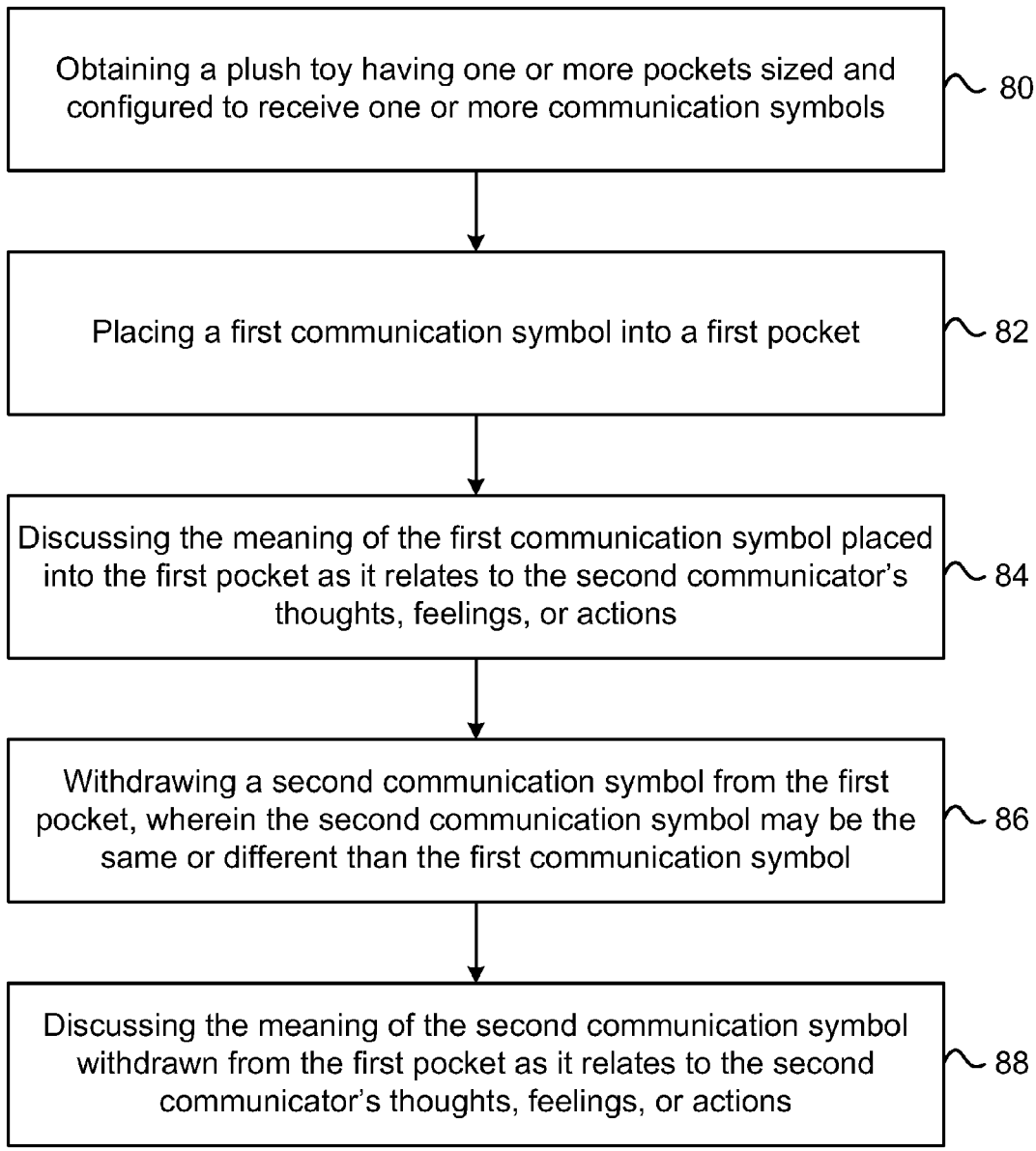
FIG. 14 shows a representative flow diagram that illustrates an example sequence that may be used to facilitate teaching of desired behaviors, values, principles, and skills.

In addition to the features and characteristics previously described, each of the pockets previously discussed and included in some embodiments of the communication device of the present invention may be used according to the following method. With reference now to FIG. 14, a plush toy 12 is provided at block 80 according to some embodiments of the present invention, as discussed in detail above. At block 82, a first communication symbol may be placed into a first pocket. The first communication symbol and the associated pocket may be any of those previously discussed. At block 84, the first communicator and the second communicator engage in a discussion regarding the meaning of the first communication symbol as it is placed into the first pocket. The discussion between the two communicators relates to the feelings, thoughts, and/or actions of the second communicator. At block 86 a second communication symbol is withdrawn from the first pocket. Again, both the second symbol and the pocket may be any of those previously discussed. Further, the second communication symbol may be either the same or different from the first communication symbol. At block 88, the two communicators again discuss the meaning of the second communication symbol as it is withdrawn from the first pocket as it relates to the feelings, thoughts, and/or actions of the second communicator.

By way of summary, the following example is provided to elucidate how the steps previously discussed may be further implemented in some embodiments. Implementation of the present invention may occur when a second communicator, such as a child, engages in behavior that is discouraged by a first communicator, such as a parent. Such behavior could include, for example, fighting, lying, steeling, hurting others and so forth. Under circumstances akin to those described, a communication process may be implemented between the first and second communicator in the following way.

First, a communication device 10, such as a plush toy 12 described above, having one or more pockets may be obtained. The pockets on the communication device may be sized and configured to receive one or more communication symbols. The communication symbol may be any item including written articles or physical objects and the like which serve as an emblem for the topic being discussed, such as fighting. The process continues as a first communication symbol is placed into a first pocket on the communication device. As the first symbol is placed into the first pocket, the first and second communicators discuss the meaning of the symbol as it relates to the second communicators feelings, thoughts, or actions. For example, where the second communicator has engaged in fighting discouraged by the first communicator, the first communication symbol represents fighting. As the fighting symbol is inserted into the first pocket, the first and second communicator may discuss the second communicator's feelings or thoughts that lead to his or her fighting actions. In addition, the first communicator may explain why fighting is discouraged.

The process continues as a second communication symbol, which may be the same or different than the first, is withdrawn from the first pocket. As with the first communication symbol, the second communication symbol may be any item that will serve as an emblem for a desired topic of discussion. Continuing the above example, the second communication symbol may represent peace or another antonym to fighting. As the peace symbol is withdrawn from the first pocket, the first and second communicator may discuss the second communicator's feelings or thoughts about peace particularly as they relate to the second communicator's previous actions. In addition, the first communicator may explain why peace is desirable.

The foregoing communication process is adapted to facilitate teachings of desired behaviors, values, principles, and skills by opening up a channel of amicable communication or dialogue between two communicators. In addition, the communication device 10 serves to visually and physically interpose a thought process between the second communicator's initial conduct and his or her subsequent thoughts, feelings and/or actions regarding that conduct.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

The invention claimed is:

1. A communication device between a first communicator and a second communicator to facilitate teaching of desired behaviors, values, principles, and skills comprising:
   a plush toy comprising:
      a body having a front side and back side;
      a head connected to the body;
      one or more upper extremities connected to the body adjacent the head; and
      one or more lower extremities connected to the body opposite the one or more upper extremities; and
   a plurality of pockets disposed on the plush toy to receive a plurality of communication symbols which are configured to be placed into and withdrawn from said pockets by the first communicator and the second communicator, wherein the plurality of pockets comprise:
  a pocket is disposed on the head to receive one or more communication symbols containing words and/or images representing thoughts, goals, plans, or ambitions of the second communicator or feelings of the first communicator; and
  a pocket disposed on the front side of the body that receives one or more selectively removable and interchangeable communication symbols.

2. The communication device according to claim 1, wherein the selectively removable and interchangeable communication symbols received by the pocket disposed on the front side of the body comprise symbolic hearts.

3. The communication device according to claim 2, wherein the one or more symbolic hearts comprise a pocket disposed therein to receive one or more communication symbols which are configured to be placed into and withdrawn from said pocket by the first communicator and/or second communicator.

4. The communication device according to claim 3, wherein the communication symbols contain words and/or images representing goals or dreams of the second communicator.

5. The communication device according to claim 1, wherein the one or more upper extremities are connected to the body at a proximal end thereof and wherein the one or more upper extremities comprise a pocket disposed at a distal end thereof.

6. The communication device according to claim 5, wherein the communication symbols contain words and/or images representing emotional feelings of the second communicator.

7. The communication device according to claim 1, wherein the one or more lower extremities are connected to the body at a proximal end thereof and wherein the one or more lower extremities comprise a pocket disposed at a distal end thereof.

8. The communication device according to claim 7, wherein the communication symbols contain words and/or images representing values the second communicator promotes.

9. The communication device according to claim 1, comprising a pocket disposed on the back side of the body.

10. The communication device according to claim 9, wherein the communication symbols contain words and/or images representing serving or giving to others.

11. A communication device between a first communicator and a second communicator to facilitate teaching of desired behaviors, values, principles, and skills comprising:
  a plush toy comprising:
    a body having a front side and back side;
    a head connected to the body;
    a removable cape disposed adjacent the head, wherein the cape receives badges of honor earned by the second communicator for good behavior as previously defined between the first communicator and the second communicator and selectively granted, denied, or revoked by the first communicator for bad behavior as previously defined between the first communicator and the second communicator;
    one or more upper extremities connected to the body adjacent the head; and
    one or more lower extremities connected to the body opposite the one or more upper extremities; and
  one or more pockets disposed on the plush toy to receive one or more communication symbols which are configured to be placed into and withdrawn from said pockets by the first communicator and/or second communicator.

12. The communication device according to claim 11, wherein the badges of honor represent a value.

13. The communication device according to claim 12, wherein the value is selected from love, appreciation, listening, patience, communication, self-control, helping, learning, health, fitness, excellence, environmental responsibility, reverence, safety, patriotism, integrity, honor, discipline, hope, fortitude, kindness, compassion, and accountability.

14. The communication device according to claim 1, wherein the second communicator is a person or group of people learning or acquiring the desired behavior, value, principle, or skill.

15. The communication device according to claim 1, wherein the first communicator is a person or group of people who desires the second communicator to learn or acquire the desired behavior, value, principle, or skill and who communicates with the second communicator to facilitate said learning or acquisition.

16. The communication device according to claim 1, further comprising an electronic audio playback component adapted to record and playback contemporaneously and/or previously recorded messages disposed within the plush toy body, head, or extremities.

17. The communication device according to claim 16, further comprising a recording system adapted to work in concert with the electronic audio playback component or independent therefrom.

18. The communication device according to claim 1, further comprising an electronic device adapted to encode and/or decode audio signals, files and/or streams.

19. The communications device according to claim 1, further comprising a safety device adapted to send a wireless message or notification.

* * * * *